(12) United States Patent
Eguchi et al.

(10) Patent No.: US 6,733,299 B2
(45) Date of Patent: May 11, 2004

(54) VEHICULAR POWER TRANSMISSION

(75) Inventors: Takahiro Eguchi, Wako (JP); Masaaki Yamaguchi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/234,845

(22) Filed: Sep. 5, 2002

(65) Prior Publication Data

US 2003/0073535 A1 Apr. 17, 2003

(30) Foreign Application Priority Data

Oct. 16, 2001 (JP) ........................................ 2001-317659

(51) Int. Cl.$^7$ ............................................. B60K 41/02
(52) U.S. Cl. ........................................................ 477/176
(58) Field of Search ................................ 477/166, 174, 477/175, 176, 180

(56) References Cited

U.S. PATENT DOCUMENTS

| | | | | |
|---|---|---|---|---|
| 5,588,937 A | * | 12/1996 | Kono et al. | 477/176 X |
| 5,726,353 A | * | 3/1998 | Matsuda et al. | 73/118.1 |
| 5,807,209 A | * | 9/1998 | Matsubara et al. | 477/176 |
| 5,935,043 A | * | 8/1999 | Watanabe et al. | 477/169 |

FOREIGN PATENT DOCUMENTS

| | | | | |
|---|---|---|---|---|
| JP | 406094122 | * | 4/1994 | 477/176 X |

* cited by examiner

*Primary Examiner*—Roger Pang
(74) *Attorney, Agent, or Firm*—Arent Fox PLLC

(57) ABSTRACT

A power transmission comprises a continuously variable transmission CVT, which transmits a rotational driving force from an engine to wheels, a starting clutch 5, which sets variably the transmission capacity of the continuously variable transmission, and a control valve CV, which controls the engagement actuation of the starting clutch 5. While a vehicle equipped with this power transmission is decelerating, the engagement of the starting clutch is controlled to transmit a rotational driving force from the wheels to the engine. Specifically, the engaging capacity of the starting clutch is controlled to bring the difference between the input and output rotational speeds of the starting clutch into a predetermined range, and the control pressure of the starting clutch that brings this difference in the predetermined range is learned, i.e., stored in memory and renewed, as a control value for the next deceleration of the vehicle.

7 Claims, 5 Drawing Sheets

VEHICULAR POWER TRANSMISSION

FIELD OF THE INVENTION

The present invention relates to a power transmission which comprises a drive-power transmission (for example, a power transmission), which transmits a driving force from an engine to drive wheels, and a frictionally engaging element (for example, a starting clutch) whose capacity for transmitting a driving force frictionally is variably set.

BACKGROUND OF THE INVENTION

Many automobiles are equipped with such a power transmission, and in the power transmission, a hydraulically actuated frictionally engaging element (for example, a hydraulic clutch) is used for speed ratio control, power transmission control, etc. For example, by controlling the engagement actuation of the hydraulic clutch, the torque transmission can be controlled. For instance, while the vehicle is in a deceleration, the slip factor of the hydraulic clutch is controlled to come into a predetermined range (the slip factor is controlled to allow a little slip), so that the hydraulic clutch can slide to avoid a shock, which may occur from an abrupt change in the torque transmission. Also, the engagement characteristics of the clutch such as a characteristic of engagement initiation are determined and stored in memory in a learning control, which exploits that the torque transmission of the hydraulic clutch calculated from the actuation pressure of the hydraulic clutch equals the actual torque transmission of the hydraulic clutch while the hydraulic clutch is sliding.

Recently, a hybrid-type power transmission, which incorporates an electrical motor generator, has been developed and is coming into practical use. This electrical motor generator, which is connected to the output shaft of the engine, is used to assist the engine in rotational drive as an electrical motor when the vehicle is started. Also, it is used to regenerate energy (by generating electricity) as an electrical generator when the vehicle is in a deceleration. In such a power transmission, if the hydraulic clutch is controlled to slide while the vehicle is in a deceleration, then there is a problem that the efficiency of energy regenerating by the electrical motor generator (energy-regenerating device) is reduced by the amount that corresponds to the sliding of the hydraulic clutch. On the other hand, to keep the efficiency of energy regenerating at a high level, if the hydraulic clutch is controlled to keep a full engagement, then the hydraulic clutch, which does not slide effectively, cannot be used as a device to prevent a shock which may occur from an abrupt change in the torque transmission. Also, the above mentioned learning control, in which the characteristics of the hydraulic clutch are determined and learned for controlling the torque transmission, cannot not be executed as designed.

Conventionally, in the engagement control of the hydraulic clutch, the slip factor of the hydraulic clutch is set at a predetermined value while the vehicle is in a deceleration. With a fixed slip factor, the amount of rotational slide (the difference between the input rotational speed and the output rotational speed) is relatively large while the vehicle is travelling at a high speed with the clutch rotating at a high rotational speed, and conversely, the amount of rotational slide is relatively small while the vehicle is travelling at a low speed with the clutch rotating at a low rotational speed. Here, if the amount of rotational slide is too small for the friction coefficient $\mu$ to be stable, then the learning control, which involves the determining and learning of the engagement characteristic of the clutch, tends to be inaccurate. For the learning control to be performed accurately, the amount of rotational slide must be maintained within a predetermined range. In a case of prior art where the slip factor is set at a predetermined value for the engagement control of the hydraulic clutch, if the amount of rotational slide is set into a predetermined range appropriate to the learning control while the vehicle is travelling at a low speed, then this setting causes a large amount of rotational slide when the speed of the vehicle increases to a high speed, reducing the efficiency of the energy regenerating. Conversely, if the amount of rotational slide is set into a predetermined range appropriate to the learning control while the vehicle is travelling at a high speed, then only a little amount of rotational slide is available when the speed of the vehicle decreases to a low speed, which condition destabilizes the friction coefficient of the clutch and thereby makes the learning control inaccurate.

SUMMARY OF THE INVENTION

To solve the above mentioned problems, it is an object of the present invention to provide a power transmission whose frictionally engaging element provided in a drive-power transmission is adjustable to set the amount of rotational slide to a minimum value within a range that is appropriate to a learning control of engagement characteristic, so that the learning control will be performed accurately without any sacrifice in energy regenerating efficiency.

To achieve this objective, the present invention provides a power transmission that comprises a drive-power transmission (for example, the continuously variable transmission CVT described in the following embodiment), a frictionally engaging element (for example, the starting clutch 5, the forward clutch 25 and the reverse brake 27 described in the following embodiment) and a transmission-capacity controller (for example, the control valve CV described in the following embodiment). The drive-power transmission transmits a rotational driving force from an engine to wheels, and the frictionally engaging element can set variably a transmission capacity for said drive-power transmission. The transmission-capacity controller controls the engagement actuation of the frictionally engaging element. While a vehicle equipped with this power transmission is decelerating, the engagement of the frictionally engaging element is controlled to transmit a rotational driving force from the wheels to the engine. In this instance, the transmission-capacity controller controls the engaging capacity of the frictionally engaging element to bring the difference between the input and output rotational speeds of the frictionally engaging element into a predetermined range. While this difference is within the predetermined range, the transmission-capacity controller stores and renews in memory and learns the controlled amount of the frictionally engaging element as a control value to be used for the next deceleration of the vehicle.

According to the power transmission, which is constructed as described above, while a rotational driving force is transmitted from the wheels to the engine during a deceleration of the vehicle, the transmission-capacity controller controls the engagement of the frictionally engaging element to adjust the difference between the input and output rotational speeds into the predetermined range, where the friction coefficient $\mu$ of the frictionally engaging element is stable. Because of this adjustment, the engagement characteristic of the frictionally engaging element is determined accurately, which in turn makes the learning control accurate. In this case, because the engagement control of the frictionally engaging element is executed to bring the amount of rotational slide rather than the slip factor thereof into the predetermined range, the engagement characteristic can be determined accurately at any speed of the vehicle. Therefore, the learning control itself can be accurate and reliable.

Furthermore, while a rotational driving force is being transmitted from the wheels to the engine during a deceleration, it is preferable that the transmission-capacity controller control the engagement capacity of the frictionally engaging element to bring the difference between the input and output rotational speeds at first temporarily to a value above the predetermined range and then into the predetermined range. The friction coefficient $\mu$ of the frictionally engaging element has different values if it is measured by increasing the amount of rotational slide from a complete engagement thereof and if it is measured by decreasing the amount of rotational slide from a slipping condition thereof (because of a phenomenon of hysteresis). To avoid the effect of this hysteresis, in the present invention, after the amount of rotational slide (the difference of the input and output rotational speeds) is made larger, it is made smaller for the learning control. In this way, the engagement characteristic can be determined accurately without any effect of the hysteresis, so the learning control can be also performed accurately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
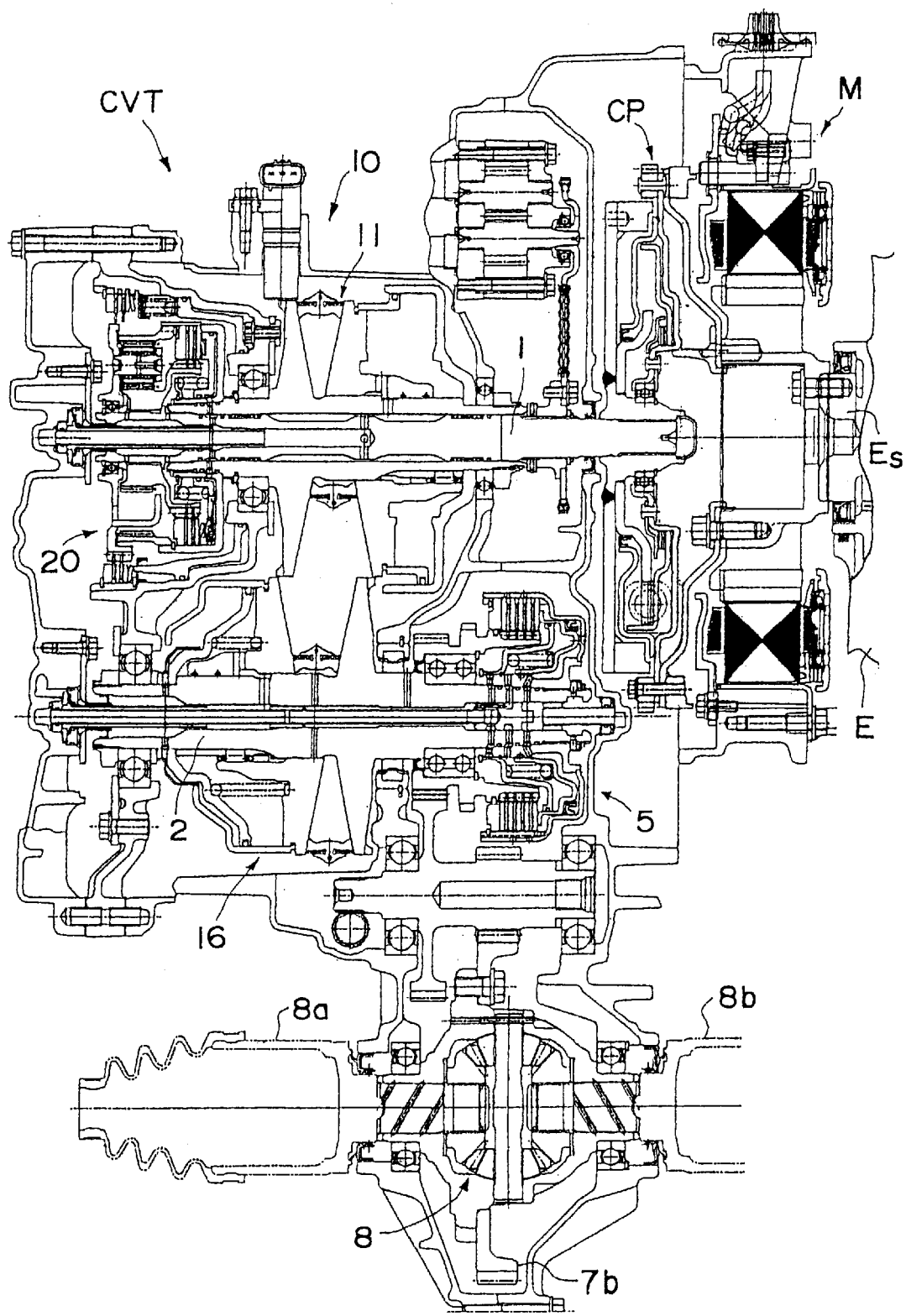
FIG. 1 is a sectional view describing the construction of a power transmission according to the present invention.
Figure 2:
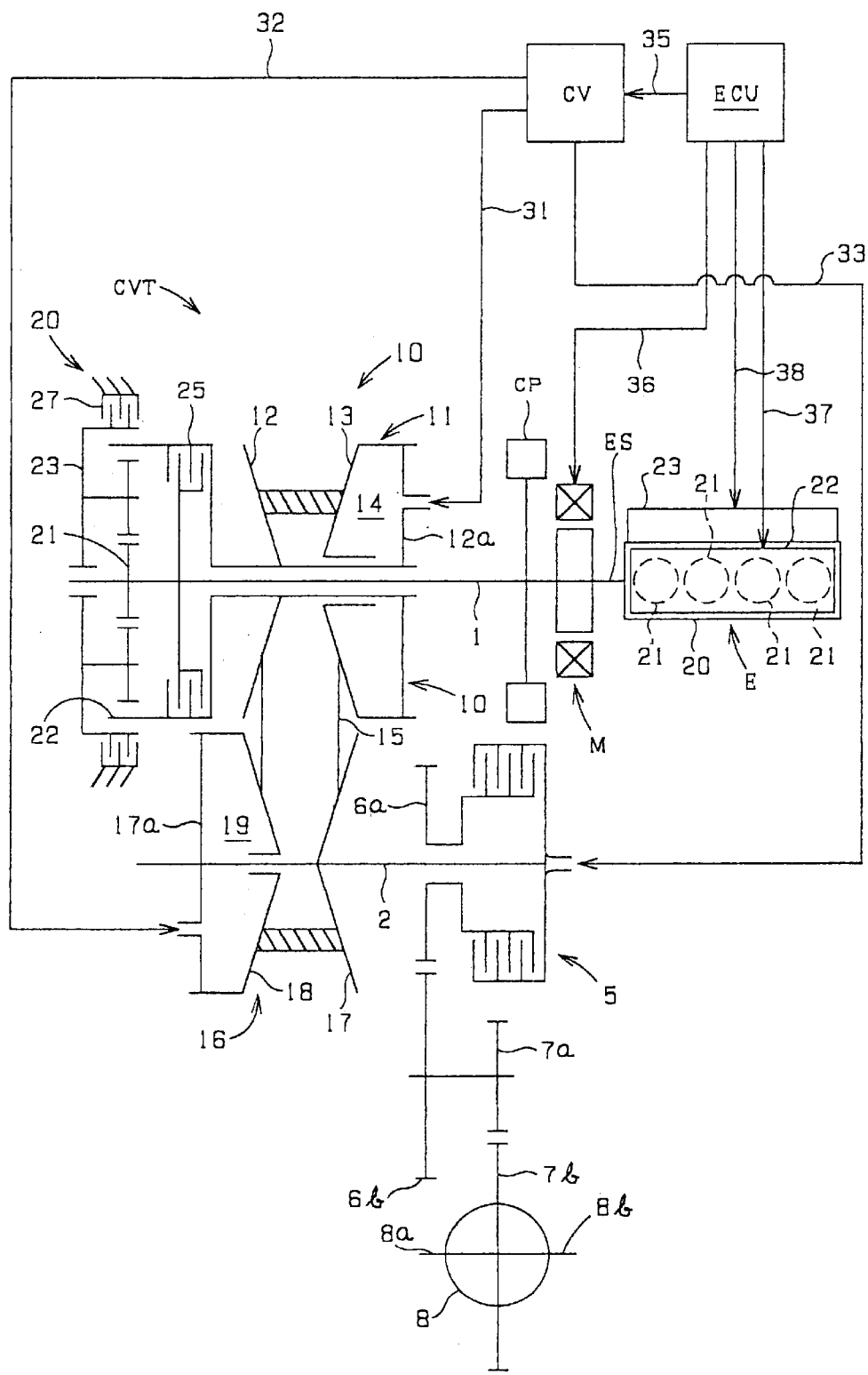
FIG. 2 is a schematic diagram describing the power transmission system of the power transmission.

A preferred embodiment according to the present invention is described in reference to the drawings. FIG. 1 is a sectional view describing the construction of a power transmission as an embodiment according to the present invention, and FIG. 2 shows the power transmission system of this transmission. It is clear from these drawings that this power transmission comprises an engine E, an electrical motor generator M, which is connected to the output shaft Es of the engine E, and a belt-type continuously variable transmission CVT, which is connected through a coupling mechanism CP to the output shaft Es of the engine.

The engine E is a four cylinder reciprocating engine and has a piston in each of the four cylinder bores 21 formed in a cylinder block 20. The engine E is also equipped with a suction and exhaust controller 22, which controls the operation of the suction valves and the exhaust valves for each cylinder bore 21, and with a fuel injection and ignition controller 23, which controls the injection of fuel and the ignition for each cylinder bore 21. The electrical motor generator M assists the driving force of the engine when it is powered by a battery incorporated in the vehicle, and it charges the battery by generating electricity from the rotational drive received from the wheel side while the vehicle is in a deceleration (energy regenerating). Thus, this power transmission has a hybrid-type drive source.

The continuously variable transmission CVT comprises a metal V-belt mechanism 10, a forward/reverse switching mechanism 20 and a starting clutch (main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to a differential mechanism 8 and then used for driving axle shafts 8a and 8b to rotate right and left wheels of the vehicle (not shown).

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the lateral outside of the movable pulley half 13, a drive-pulley cylinder chamber 14 is defined by a cylinder wall 12a, and a pulley-control pressure supplied through a control valve CV and through an oil passage 31 into the cylinder chamber 14 generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the lateral outside of the movable pulley half 18, a driven-pulley cylinder chamber 19 is defined by a cylinder wall 17a, and a pulley-control pressure supplied through the control valve CV and through an oil passage 32 into the cylinder chamber 19 generates a thrust which shifts the movable pulley half 18 in the axial direction of the driven pulley.

In this construction, the hydraulic pressures being supplied into these cylinder chambers 14 and 19 of the drive and driven pulleys, respectively, are controlled by the control valve CV to generate appropriate lateral thrusts in these two pulleys, so that there will be no slip of the belt 15. Furthermore, these pressures supplied into the cylinder chambers are controlled to create a difference in these lateral thrusts, so that the groove widths of these pulleys will change, adjusting the pitch radii of the respective pulleys for the V belt 15. In this way, the speed change ratio of the transmission is controlled to vary continuously without any step. These lateral thrusts, which are generated in the drive and driven pulleys for the ratio control, are generated from a line pressure that is adjusted by a regulator valve from the pressure of a hydraulic pump (not shown) driven by the engine E. More specifically, the pressure of either the drive or driven cylinder chamber that is the higher of the two is produced from the line pressure.

The forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when the forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction). The engagement operation of the forward clutch 25 and the reverse brake 27 is controlled with a forward/reverse control pressure that is adjusted by the control valve CV from the line pressure.

The starting clutch 5 is a clutch to control the power transmission between the countershaft 2 and the output members of the transmission, i.e., power transmission gears 6a, 6b, 7a and 7b. In the condition where the starting clutch 5 is engaged, the output of the engine, after undergoing the speed ratio change by the metal V-belt mechanism 10, is transmitted through the gears 6a, 6b, 7a and 7b to the differential mechanism 8 and then divided and transmitted by the differential mechanism 8 to the right and left axle shafts 8a and 8b and then to the wheels. When the starting clutch 5 is released, this power transmission is terminated, so the transmission is in neutral condition. The engagement of the starting clutch 5 is controlled with a clutch control pressure that is adjusted by the control valve CV from the line pressure and supplied through an oil passage 33.

In this continuously variable transmission CVT, as described above, the pulley-control pressures supplied to the drive and driven pulleys from the control valve CV through the oil passages 31 and 32, respectively, are used for the speed ratio change control while the forward/reverse control pressure supplied to the forward clutch 25 and the reverse brake 27 from the control valve CV through an oil passage (not shown) is used for the forward/reverse switching control of the transmission. In addition, the clutch control pressure supplied from the control valve CV through the oil passage 33 is used for the starting clutch engagement control. The operation of the control valve CV itself is controlled by means of control signals sent from an electrical control unit ECU.

In the vehicle incorporating this transmission, the electrical motor generator M assists the driving force of the engine E, so that the engine E can operate in a range which is most fuel efficient. To improve the fuel efficiency of the vehicle, the operation of the electrical motor M is controlled by means of control signals sent from the electrical control unit ECU through a control line 36. Simultaneously, the speed ratio change control is performed to achieve an optimal speed change ratio for operating the engine E in a most fuel efficient manner. This control is also executed by means of control signals sent from the electrical control unit ECU through a control line 35 to the control valve CV.

Furthermore, the engine E can be operated in a partial cylinder operation mode where some of the four cylinders are set in a stand-by condition when a predetermined condition is satisfied for the vehicle (for example, in a deceleration). More specifically, while the electrical control unit ECU controls the operation of the suction and exhaust controller 22 with control signals sent through a control line 37 and the operation of the fuel injection and ignition controller 23 through a control line 38, to operate the engine in a partial cylinder operation mode, it keeps suction and exhaust valves being closed for some cylinder bores 21 and inhibits these cylinders from receiving fuel injection and ignition. By operating the engine in this way, the fuel efficiency of the vehicle is improved especially during the vehicle's deceleration. In addition, the force of engine brake is made relatively small, so that the energy spent for the deceleration is regenerated effectively by the electrical motor generator M.

In this power transmission, additionally, an idling elimination control is performed to further improve the fuel efficiency. The idling elimination control is basically to stop the operation of the engine itself after the vehicle comes to a halt and when the driving force of the engine becomes unnecessary, i.e., the engine enters into an idling condition. In the idling elimination control executed for this power transmission, to achieve a higher level of fuel efficiency, specifically, when the accelerator pedal is released to decelerate the vehicle and to bring it into a halt, the fuel injection is terminated during the deceleration, and this condition for the engine is kept for elimination of engine idling.

In the power transmission, which has the above described construction, while the vehicle is in a deceleration, the electrical control unit ECU operates the control valve CV to supply the clutch control pressure to the starting clutch 5 through the oil passage 33 so as to control the engagement of the starting clutch 5. Now, this engagement control of the starting clutch 5 is described with respect to the flowcharts of FIG. 3 and FIG. 4 and to the time diagram of FIG. 5. The following description uses an example where the vehicle decelerates from a speed higher than 70 km/h.

In this control, at first, a determination is made whether or not the vehicle is in a deceleration, i.e., the accelerator pedal is released to decelerate the vehicle, at Step S1. If the vehicle is not decelerating, the control flow ends without performing any further control step described here. In this case, another control which is not illustrated in the drawings is performed for the power transmission. However, such a control is not related to the present invention, so no description of it is offered here.

Figure 5:
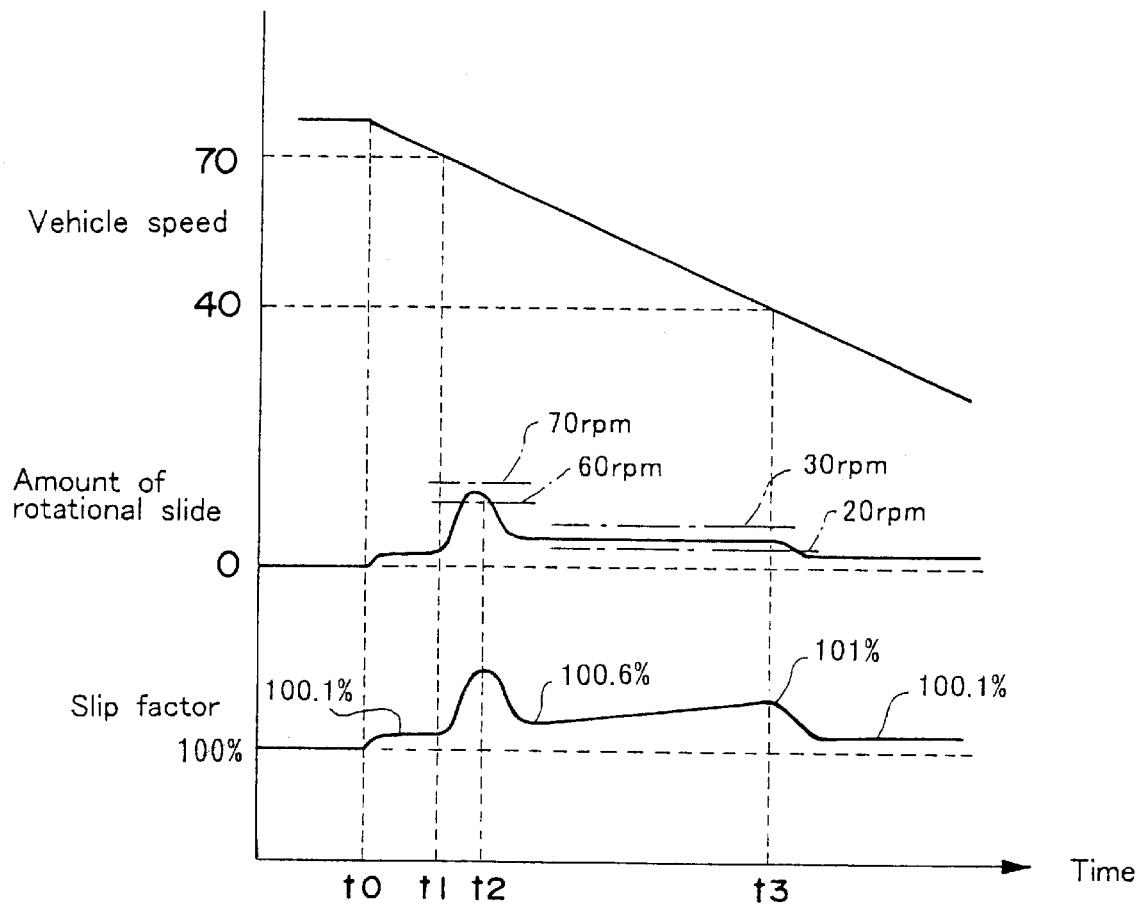
FIG. 5 is a time diagram showing chronological changes observed in the speed of the vehicle and in the rotational slide of the starting clutch.

In this example, the accelerator pedal is released at time t0 to decelerate the vehicle by an action of engine brake as shown in FIG. 5. If the vehicle is decelerating after time t0, the control flow proceeds to Step S2, where another determination is made whether or not the current speed V of the vehicle is equal to or higher than 40 km/h. At time t0, the current speed V is higher than 40 km/h (V>40 km/h), so the control flow proceeds to Step S3, where another determination is made whether or not the current speed V of the vehicle is lower than 70 km/h. At time t0, the vehicle speed V is above 70 km/h, and it is not within a speed range for which the learning control is executed. In this case, the control flow proceeds to Step S6, where the engagement control is executed to bring the slip factor of the starting clutch 5 to a very small value (for example, 100.1%). In this way, the decelerating rotation of the wheels is transmitted to the electrical motor generator M with almost no loss for the regenerating of energy (electricity generation) at a high efficiency. The slip factor above 100% means that the starting clutch 5 slips by the rotational drive of the wheels. Conversely, the slip factor below 100% means that the starting clutch 5 slips by the rotational drive of the engine E.

As the vehicle decelerates while the control at Step S6 is being executed, and when the vehicle speed V becomes lower than 70 km/h (at time t1 in FIG. 5), the control flow proceeds from Step S3 to Step S10, where the starting clutch engagement learning control is executed. In this control, whose contents are described in FIG. 4, at first, a determination is made whether this shift of the control flow to the learning control is in an initial stage or not at Step S11. While it is in the initial stage, the control flow proceeds to Step S12, where an upper limit SNH and a lower limit SNL for the sliding rotational speed of the starting clutch 5 are set as SNH=70 rpm and SNL=60 rpm. Based on these limits, if the actual sliding rotational speed SN (the difference between the input and output rotational speeds of the starting clutch 5) is higher than the upper limit SNH, then the engaging force of the starting clutch 5 is increased at Step S14 and Step S15. On the other hand, if it is lower than the lower limit SNL, then the engaging force is reduced at Step S16 and Step S17. In this way, the engagement control of the starting clutch 5 is executed to set the actual sliding rotational speed SN to a relatively high value between 60 rpm and 70 rpm in the initial stage (the time period between time t1 and time t2).

After the completion of the control for the initial stage (time t2), the control flow proceeds from Step S11 to Step S13, where the upper and lower limits for the sliding rotational speed of the starting clutch 5 are set as SNH=30 rpm and SNL 20 rpm. Based on these limits, if the actual sliding rotational speed SN (the difference between the input and output rotational speeds of the starting clutch 5) is higher than the upper limit SNH, then the engaging force of the starting clutch 5 is increased at Step S14 and Step S15. On the other hand, if it is lower than the lower limit SNL, then the engaging force is reduced at Step S16 and Step S17. In this way, after the initial stage (after time t2), the engagement control of the starting clutch 5 is executed to set the sliding rotational speed SN to a value between 20 rpm and 30 rpm.

For the control to be executed after the initial stage, the control flow proceeds form Step S18 to Step S19, where a determination is made whether or not the sliding rotational speed SN has come to a value within the above range, i.e., 20 rpm~30 rpm. If the sliding rotational speed SN has come to a value within this range, then the control flow proceeds to Step S20, where the current clutch pressure PCA as the engagement control pressure of the starting clutch 5 is used to renew a first learned value PCL1. Here, a predetermined percentage of the difference between the value of the current clutch pressure PCA and the first learned value PCL1 (for example, 10% of it) is calculated as a first adjusting value ΔPC1, and this first adjusting value ΔPC1 is added to the first learned value PCL1 to gain a new first learned value PCL1 as renewal.

There is a phenomenon of hysteresis in the friction coefficient $\mu$ of the starting clutch 5. The value of the friction coefficient $\mu$ measured when the amount of rotational slide is increased from a firmly engaged condition of the starting clutch 5 differs from that measured when the amount of rotational slide is decreased from a slipping condition thereof. In the above control, the sliding rotational speed is once set within the range of 60~70 rpm, and it is then shifted into the range of 20~30 rpm. By this procedure, the learned value PCL1 can be determined accurately without being affected from the hysteresis phenomenon of the friction coefficient.

Figure 3:
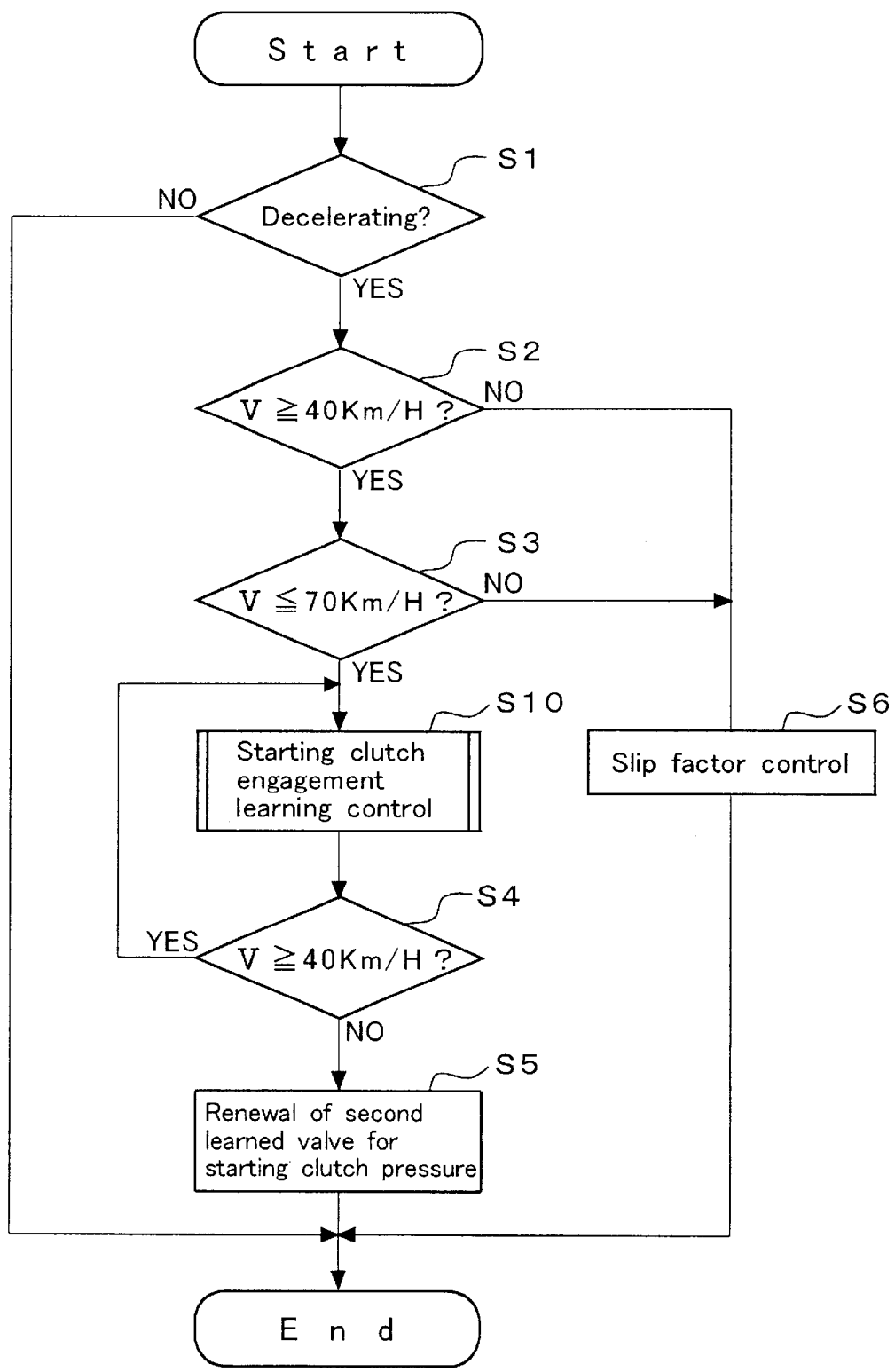
FIG. 3 is a flowchart showing control steps executed for learning the engagement pressure of a starting clutch provided in the power transmission.
Figure 4:
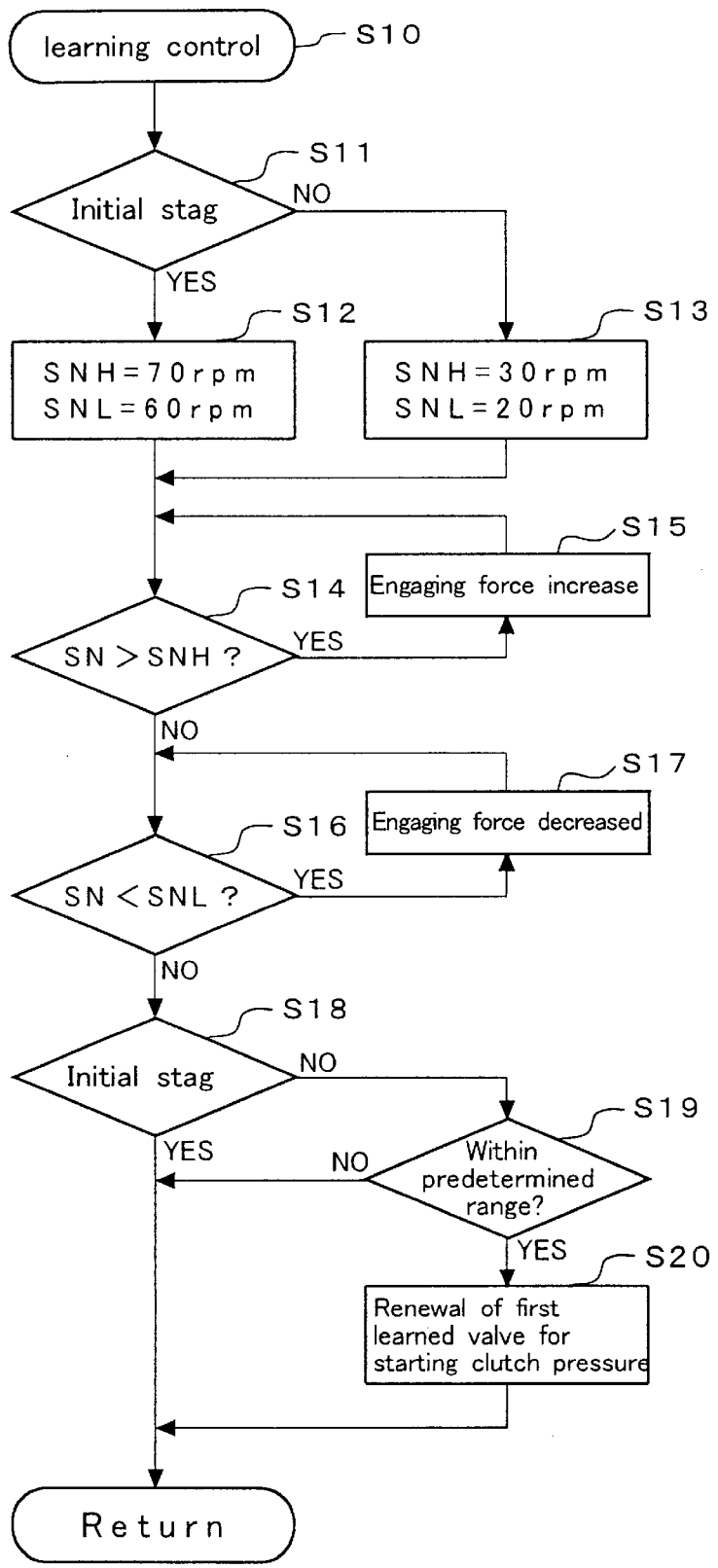
FIG. 4 is a flowchart showing the control steps of the starting clutch engagement learning control executed in the control flow shown in FIG. 3.

The above starting clutch engagement learning control executed at Step S10 is repeated periodically at predetermined intervals to renew the first learned value PCL1 until the determination at Step S4 of the control flow shown in FIG. 3 results in that the vehicle speed V has become lower than 40 km/h. It is clear from the above description that the range where the vehicle speed V is from 70 km/h to 40 km/h is the learning control range, where the learning control at Step S10 is repeated at predetermined intervals.

As the vehicle speed V decreases gradually, and when it is determined to have become lower than 40 km/h at Step S4 (time t3), the control flow proceeds to Step S5. Here, the first learned value PCL1 learned and renewed at Step S10 as described above is now used to renew a second learned value PCL2. In this case, a predetermined percentage of the difference between the first learned value PCL1 and the second learned value PCL2 (for example, 10% of it) is calculated as a second adjusting value ΔPC2, and this second adjusting value ΔPC2 is added to the second learned value PCL2 to gain a new second learned value PCL2 as renewal. In other words, the second learned value PCL2 is renewed by the first learned value PCL1 that is the learned value renewed repeatedly at predetermined intervals while the vehicle speed V is in the learning control range during a session of deceleration.

This means that the second learned value PCL2 is renewed every time when the vehicle is decelerated, and this value actually corresponds to the characteristic of the starting clutch 5. Therefore, the second learned value PCL2 is used for determining the characteristic of the starting clutch 5, and the characteristic so determined is used for performing the engagement control of the starting clutch 5 more appropriately in the following deceleration of the vehicle or in the following ordinary cruising. In the deceleration of the vehicle after the renewal of the second learned value PCL2 at Step S5 (after time t3), the vehicle speed V becomes lower than 40 km/h. As a result, the control flow proceeds from Step S2 to Step S6, where the engagement control is executed to bring the slip factor of the starting clutch 5 to a very small value (for example, 100.1%). In this way, the decelerating rotation of the wheels is transmitted to the electrical motor generator M with almost no loss for the regenerating of energy (electricity generation), i.e., at a high efficiency.

The above embodiment is described in relation to the engagement control of the starting clutch 5. However, the application of the present invention is not limited to the starting clutch 5. The present invention can be applied in the same way also to the engagement control of the forward clutch 25 and the reverse brake 27. In the above embodiment, a continuously variable transmission with a metal V-belt mechanism 10 is used as an example, but any other type of continuously variable transmission or a gear-type automatic transmission may be equally used instead.

As described above, according to a feature of the present invention, while the vehicle is in a deceleration with the rotational driving force of wheels being transmitted to the engine, a transmission-capacity controller performs an engagement control to adjust the difference between the input and output rotational speeds of a frictionally engaging element to a value within a predetermined range where the friction coefficient μ of the frictionally engaging element is stable, and determines accurately an engagement characteristic of the frictionally engaging element for a learning control. In this case, because the engagement control of the frictionally engaging element is executed to make the amount of rotational slide, instead of the slip factor thereof, come into a predetermined range, the engagement characteristic can be determined accurately at any speed of the vehicle. This makes the learning control also accurate and simple.

Furthermore, while the vehicle is in a deceleration with the rotational driving force of the wheels being transmitted to the engine, it is preferable that the transmission-capacity controller control the engagement capacity of the frictionally engaging element to bring the difference between the input and output rotational speeds thereof at first temporarily to a value above the predetermined range and then to a value within the predetermined range. The friction coefficient μ of the frictionally engaging element differs if it is measured by increasing the amount of rotational slide from a complete engagement thereof and if it is measured by decreasing the amount of rotational slide from a slipping condition thereof (because of a phenomenon of hysteresis). In the above control, after the amount of rotational slide (the difference of the input and output rotational speeds) is made larger, it is made smaller for the learning control. In this way, the engagement characteristic can be determined accurately without any effect of the hysteresis, so the learning control can be also performed accurately.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-317659 filed on Oct. 16, 2001 which is incorporated herein by reference.

What is claimed is:

1. A vehicular power transmission comprising:
   a drive-power transmission, which transmits a rotational driving force from an engine to wheels;
   a frictionally engaging element, which can set variably a transmission capacity for said drive-power transmission; and
   a transmission-capacity controller, which controls an engagement actuation of said frictionally engaging element;
   wherein:
      while a vehicle is decelerating with a control to engage said frictionally engaging element being executed for transmitting a rotational driving force from said wheels to said engine, said transmission-capacity controller controls an engaging capacity of said frictionally engaging element to bring a difference between input and output rotational speeds of said frictionally engaging element into a predetermined range; and
      said transmission-capacity controller stores and renews in memory and learns a controlled amount of said frictionally engaging element that has produced said difference which is within said predetermined range, as a control value for a next deceleration,
      wherein while the vehicle is decelerating with a rotational driving force being transmitted from said engine, said transmission-capacity controller controls said engaging capacity to increase said difference between the input and output rotational speeds to a value above said predetermined range.

2. The vehicular power transmission as set forth in claim 1, wherein:
   said frictionally engaging element is a hydraulic clutch; and
   said transmission-capacity controller controls an actuation pressure supplied to said hydraulic clutch.

3. The vehicular power transmission as set forth in claim 1, wherein:
   while the vehicle is decelerating within a predetermined speed range with an accelerator being closed almost completely, said transmission-capacity controller controls the engaging capacity of said frictionally engaging element to bring the difference between the input and output rotational speeds of said frictionally engaging element into a predetermined range.

4. The vehicular power transmission as set forth in claim 1, wherein:
   while said difference between the input and output rotational speeds is in said predetermined range, said transmission-capacity controller, at predetermined intervals, uses a controlled amount of current clutch pressure, (PCA), for engagement of said frictionally engaging element as a value to renew a first learned value PCL1.

5. The vehicular power transmission as set forth in claim 4, wherein:
   while said difference between the input and output rotational speeds is in said predetermined range, said transmission-capacity controller, at said predetermined intervals, calculates a predetermined percentage of the difference between the value of the current controlled amount PCA for engagement of said frictionally engaging element and said first learned value PCL1 as a first adjusting value ΔPC1 and then uses a value that is a sum of this first adjusting value ΔPC1 and said first learned value PCL1 as a new first learned value PCL1 in said renewal.

6. The vehicular power transmission as set forth in claim 4, wherein:
   every time when the vehicle comes into a deceleration, said transmission-capacity controller uses said first learned value PCL1 to renew a second learned value PCL2, which is learned as a control value for a next deceleration.

7. The vehicular power transmission as set forth in claim 6, wherein:
   every time when the vehicle comes into a deceleration, said transmission-capacity controller calculates a predetermined percentage of the difference between said first learned value PCL1 and said second learned value PCL2 as a second adjusting value ΔPC2 and then uses a value that is the sum of this second adjusting value ΔPC2 and said second learned value PCL2 as a new second learned value PCL2 in said renewal.

* * * * *